United States Patent
Tatat et al.

(10) Patent No.: US 9,452,573 B2
(45) Date of Patent: Sep. 27, 2016

(54) METHOD FOR ACCESSING OPTICAL FIBRES INCLUDED IN AN OPTICAL MODULE OF AN OPTICAL FIBRE TRANSMISSION CABLE

(71) Applicant: DRAKA COMTEQ BV, Amsterdam (NL)

(72) Inventors: Olivier Tatat, Sangatte (FR); Alain Lavenne, Calais (FR); Jean-Pierre Bonicel, Rueil (FR)

(73) Assignee: DRAKA COMTEQ BV, Amsterdam (NL)

( * ) Notice: Subject to any disclaimer, the term of this patent is extended or adjusted under 35 U.S.C. 154(b) by 579 days.

(21) Appl. No.: 13/892,729

(22) Filed: May 13, 2013

(65) Prior Publication Data

US 2014/0035174 A1    Feb. 6, 2014

(30) Foreign Application Priority Data

Jul. 31, 2012 (FR) ..................... 12 57445

(51) Int. Cl.
   *B29D 11/00* (2006.01)
   *G02B 6/44* (2006.01)
   *G02B 6/245* (2006.01)

(52) U.S. Cl.
   CPC ..... *B29D 11/00663* (2013.01); *B29D 11/0075* (2013.01); *G02B 6/245* (2013.01); *G02B 6/4495* (2013.01); *G02B 6/4497* (2013.01)

(58) Field of Classification Search
   CPC .................. B29D 11/00663; B29D 11/0075; G02B 6/4495; G02B 6/4497; G03B 6/245
   See application file for complete search history.

(56) References Cited

U.S. PATENT DOCUMENTS

| | | | |
|---|---|---|---|
| 6,215,931 B1 | 4/2001 | Risch et al. | |
| 2002/0122639 A1 | 9/2002 | Le Noane et al. | |

FOREIGN PATENT DOCUMENTS

| | | |
|---|---|---|
| DE | 3224465 A1 | 1/1984 |
| EP | 0715193 A1 | 6/1996 |
| JP | S56168602 A | 12/1981 |
| WO | 0198810 A1 | 12/2001 |

OTHER PUBLICATIONS

French Search Report dated May 29, 2013 for corresponding French Application No. 1257445, filed Jul. 31, 2012.
European Search Report dated May 31, 2013 for European Application No. 13 16 5678.

*Primary Examiner* — Mathieu Vargot
(74) *Attorney, Agent, or Firm* — David D. Brush; Westerman Champlin & Koehler, P.A.

(57) ABSTRACT

A method is proposed for access to optical fibers contained in an optical module, with a flexible structure for example, of an optical fiber transmission cable. The optical module includes a protective sheath in which the optical fibers are housed. Such a method includes: extracting the optical module from the transmission cable; degrading a portion to be stripped of the sheath of the optical module by heating to a specific temperature, for a predetermined duration; and accessing the optical fibers by stripping the portion to be stripped that has been degraded.

10 Claims, 2 Drawing Sheets

Figure 1:
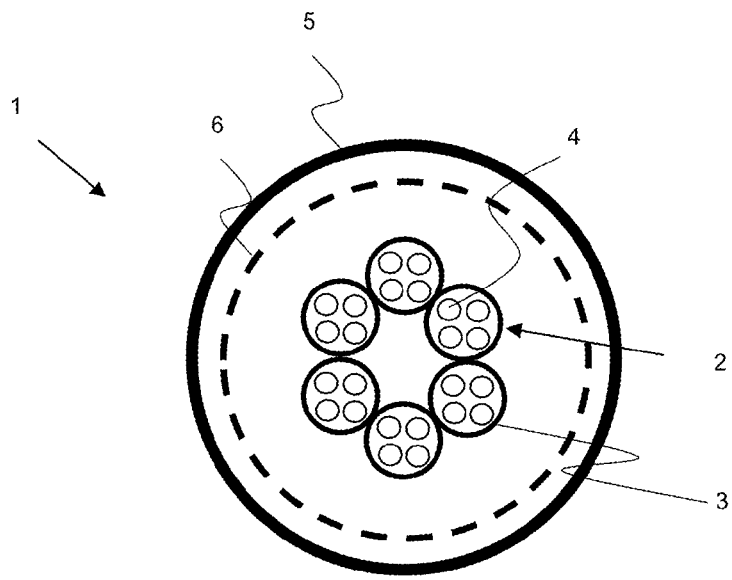

METHOD FOR ACCESSING OPTICAL FIBRES INCLUDED IN AN OPTICAL MODULE OF AN OPTICAL FIBRE TRANSMISSION CABLE

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE INVENTION

The field of the invention is that of optical fibre transmission cables.

More precisely, the invention concerns a technique for access to at least one optical fibre contained in an optical module of an optical fibre transmission cable.

TECHNOLOGICAL BACKGROUND

Optical fibre transmission cables traditionally comprise a set of optical modules, tubular in shape, each consisting of a protective sheath in which one or more optical fibres are housed. All the optical modules are surrounded by an external protective cladding (also referred to as a protective sheath) the purpose of which is to isolate the modules from the external environment. This type of cable generally comprises, in addition to the optical modules, central and/or lateral mechanical reinforcement elements intended to reinforce the mechanical properties of the cable, as well as sealing elements.

In the context of a cable installation for deploying an optical fibre communication network, connections at the cable end or along the length of the cable prove to be necessary in order to be able to connect certain optical fibres to optoelectronic equipments or to other optical fibres belonging to other cables of the network. Such connections require having access to optical fibres contained in the actual structure of the cable as simply and quickly as possible, without risking damaging the optical fibres. This access may take place either at the end of the cable or along the length of the cable (then "optical fibre tapping" is usually referred to).

First of all the external protective cladding is removed over a given length of the cable, as well as the reinforcement and sealing elements thereof, in order to bare the various optical modules containing the optical fibres. It is then necessary to strip one of the modules previously bared by removing the protective sheath made from thermoplastic material that surrounds the optical fibres in order to make access to the latter possible.

This operation may be difficult to perform. Indeed, the length of the module portion to be stripped must be able to be relatively long (typically 0.5 to 5.0 meters) and well controlled, the good rupture strength of the optical fibres must be ensured and the "stops" at the protective sheath at the limits of the stripped portion must be relatively clean.

One known stripping method of the prior art consists of manually tearing the protective sheath of the optical module either between the fingers or using fibres as a support for withdrawing the sheath from the module, for example for access at the cable end.

The stripping may also be done by means of a sharp tool when the material of the sheath proves to have an excessively thick wall or to be too rigid to be manipulatable, what is more, on portions of cables several meters long.

Such methods are generally well suited to optical modules with a rigid structure (that is to say having a very thick protective sheath, typically around 0.40 mm), but are not suitable for optical modules with a flexible or supple structure. Indeed, these flexible structure optical modules consist of a thin thermoplastic sheath (typically less than 0.25 mm), making it difficult to "work", and a manual tearing between the fingers does not allow easy access to the optical fibres. Tearability of the sheaths of optical modules with a flexible structure is moreover not always possible because of the type of material of which the protective sheath consists. Finally, the use of a cutting tool, such as a knife with a retractable blade (or cutter) for example, would risk damaging the optical fibres, even sheathed, and would require a relatively great intervention time. This solution is therefore not optimum.

SUMMARY

In a particular embodiment of the invention, a method for accessing to at least one optical fibre contained in an optical module of a an optical fibre transmission cable is proposed, the optical module comprising a protective sheath made from polymeric material in which said at least one optical fibre is housed, said method comprising the following steps:
  extraction of said optical module from said transmission cable;
  irreversible degradation of the polymeric material over a portion to be stripped of the sheath of said optical module by heating to a predetermined temperature, for a predetermined period;
  access to said at least one optical fibre by stripping said portion that has been degraded by heating;
  cleaning of said at least one optical fibre made accessible.

The general principle of the invention therefore consists of thermally degrading the polymeric material of the protective sheath of the optical module irreversibly along the portion to be stripped to facilitate stripping thereof and therefore access to the optical fibre or fibres contained inside. The heating of the sheath for a predetermined period causes irreversible degradation of the polymeric material of the sheath with continuous loss of mechanical strength until it reaches softening or even melting of the sheath. Such a degradation mechanism facilitates the removal of the sheath around the optical fibres. In some cases, the portion of module to be stripped melts, de facto stripping the optical fibres.

The method according to the invention thus facilitates the baring of the optical fibre or fibres by stripping the optical module over a given portion thereof, both central and at one end of the transmission cable.

Unlike the known techniques, which require tedious manual scraping of the sheath of the optical module, the length of the portion of the module to be stripped may, by virtue of the invention, be relatively great (able to reach several meters) and removed relatively quickly, thus not requiring any scraping.

This access technique is therefore simple, rapid and inexpensive to implement.

Preferentially, the optical module is an optical module with a flexible structure. "Optical module with a flexible structure" means, in the remainder of the description, an optical module having a sheath thickness less than or equal to 0.25 mm.

Said predetermined temperature is a specific temperature degrading said polymeric material and not impairing said at least one optical fibre from the point of view of the mechanical and optical properties.

The predetermined temperature is chosen as being the temperature at which:

the material of the sheath of the optical module softens significantly;

the mechanical and optical properties of the optical fibres contained in the optical module are preserved intact.

In other words, in choosing the predetermined temperature, account must be taken of the type of polymeric material of which the sheath consists, the thickness of the wall of the sheath and the heat-resistance of the optical fibres.

Thus, by irreversibly degrading by heating the polymeric material of the protective sheath along the portion to be stripped (along a generatrix of the sheath for example), the length of the portion of module to be stripped is well controlled and good strength of the optical fibres is ensured.

The step of degrading the sheath is said to be irreversible in that the heating applied to the polymeric material is such that the mechanical characteristics and/or the form of the sheath cannot be restored.

The step of access to said at least one optical fibre can be performed just after the step of irreversible degradation so that the material of the sheath is still hot, or after a few moments so that the material of the sheath has cooled.

Finally, the cleaning step can be performed by means of one or more solvents suitable for removing residues of polymeric material remaining on the optical fibres, resulting from the thermal degradation of the sheath. For example, a solvent based on alcohol or petrol may suit very well; no solvent based on chemical products liable to interact with the material of the optical fibres, such as acetone for example, should be used. In the case where the optical module contains a gel (for example a sealing gel), a detergent suited to removal thereof, such as a degreaser, may then be used for this purpose. The solvent or solvents and/or degreaser may be applied along the optical fibres then laid bare by means of a piece of paper or cloth.

Advantageously, the predetermined temperature is between 100° C. and 140° C. and, preferentially, the predetermined temperature is substantially equal to 130° C.

Preferentially, the predetermined heating period is less than 5 seconds, and more preferentially less than or equal to 3 seconds. The minimum heating period for obtaining satisfactory degradation of the polymeric material of the sheath is substantially equal to 0.5 seconds.

Beyond this predetermined period, there exists a risk that the optical fibre or fibres of the optical module may be mechanically and/or optically impaired.

According to a particularly advantageous feature, the step of irreversible degradation by heating is performed by means of a heating body.

The heating body may be any device capable of reaching the predetermined heating temperature. Preferentially, the heating body is configured to be portable (or able to be carried). It may thus easily be transported to the deployment site.

By way of illustrative example, the heating body is that of a paint burner. The method may therefore require known implementation means, used for other uses (a paint burner is typically used for cleaning various materials by production of a hot gas). Such a method is therefore relatively simple and inexpensive to implement.

According to a first variant embodiment, the step of degrading the polymeric material comprises a step of moving (for example by sliding) said optical module over a heated surface of the heating body all along the portion to be stripped.

According to a second variant embodiment, the step consisting of degrading the polymeric material comprises a step consisting of moving (for example by sliding) the heating body over the optical module all along the portion to be stripped.

Thus the "stops" at the protective sheath at the limits of the stripped portion are clean and the length of stripped sheath is well controlled.

Advantageously, the polymeric material of the sheath of the optical module is a material belonging to the family of thermoplastic polymers, and more precisely to the family of thermoplastic polyolefins, and even more precisely to the family of polyethylenes.

This list is not exhaustive. The polymeric material may be a mixture comprising a thermoplastic polymer and an elastomeric polymer.

Preferentially, the thickness of the protective sheath of said optical module is between 0.03 mm and 0.25 mm.

Naturally the various features of this method discussed above may be combined.

In another embodiment of the invention, use of a heating body is proposed for stripping an optical module, for example an optical module with a flexible structure, of an optical fibre transmission cable, according to the method described above (in any of its embodiments). The heating body heats to a known and preferentially adjustable temperature.

In the remainder of this document (including the description and claims), unless indicated otherwise, any number representing an amount, a quantity, a percentage or other must be understood as being able to be modified in all circumstances by the term "substantially" or "approximately" or "of the order of". Moreover, all the ranges disclosed hereinafter are delimited by extreme values (minimum and maximum values) and include more limited intermediate ranges contained therein, which may or may not be explicitly mentioned.

LIST OF FIGURES

Figure 2:
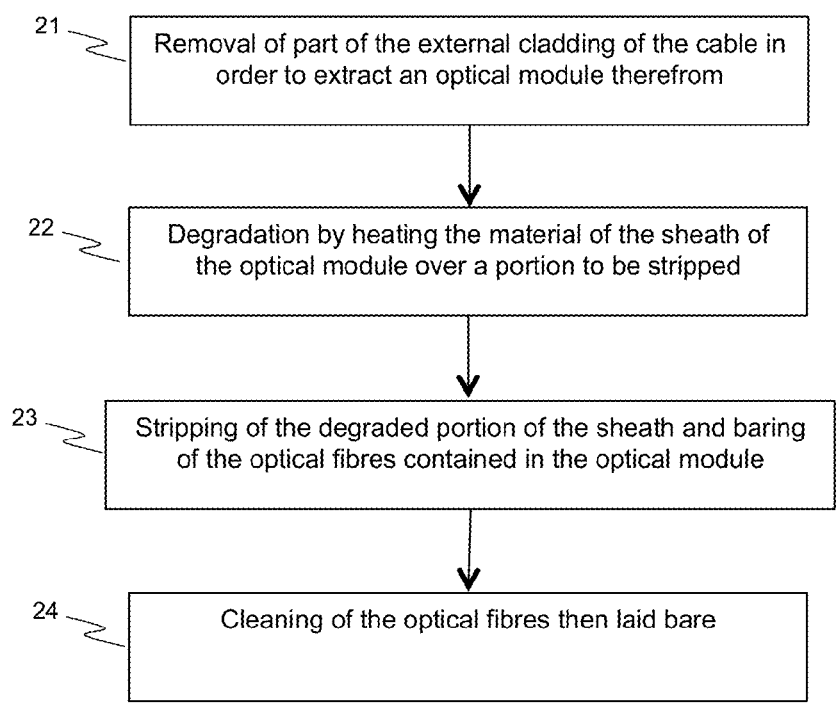
Figure 3:
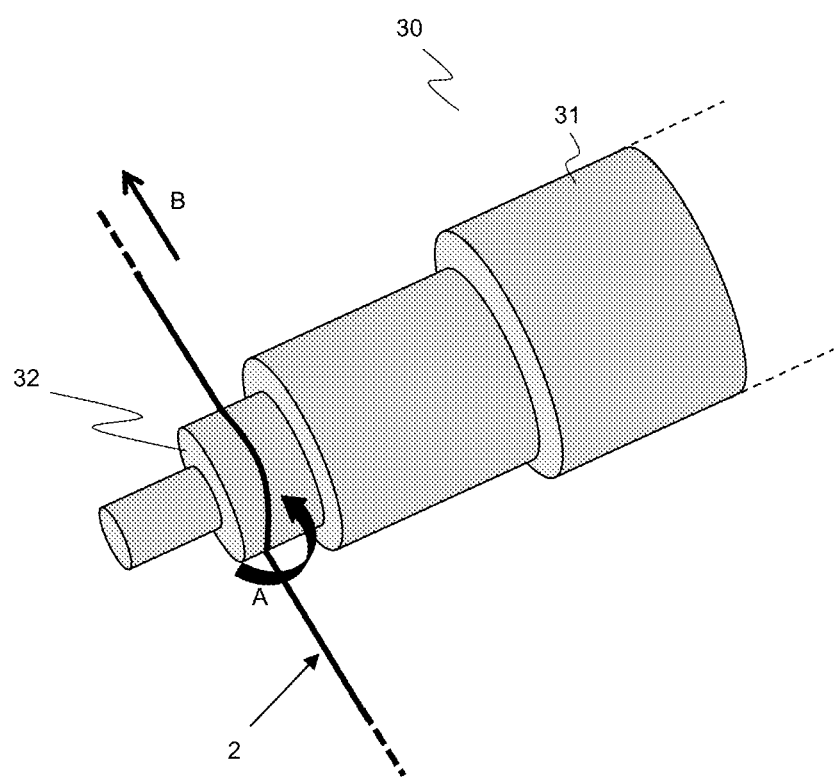

Other features and advantages of the invention will emerge from a reading of the following description, given by way of indicative and non-limitative example, and the accompanying drawings, in which:

FIG. 1 presents a view in section of an optical fibre transmission cable known from the prior art;

FIG. 2 presents a flow diagram of a particular embodiment of the method according to the invention;

FIG. 3 shows schematically the implementation of a step of heating an optical module according to a particular embodiment of the method of the invention.

DETAILED DESCRIPTION

In all the figures of the present document, identical elements and steps are designated by the same numerical reference.

FIG. 1 presents a view in section of an optical fibre transmission cable 1 known from the prior art.

This cable 1 comprises a set of six optical modules 2, tubular in shape, each consisting of a protective sheath 3 in which they are housed, in the present case four optical fibres 4. The six optical modules are surrounded by an external cladding 5 for isolating the optical modules 2 from the external environment. The cable 1 also comprises a ring of mechanical reinforcements 6, made from Kevlar for example, for improving the mechanical properties of the cable 1.

The optical modules 2 illustrated by way of example in FIG. 1 have a flexible structure: they comprise a protective sheath 3 having a small thickness, for example 0.10 mm, and composed of polyethylene.

The material of the sheath may be a material made from polyethylene belonging to the group comprising: high-density polyethylene or HDPE, medium-density polyethylene or MDPE, or low-density polyethylene or LDPE.

The optical modules may contain, in addition to the optical fibres 4, reinforcement elements (not illustrated in the figure), such as Kevlar strands for example, and/or sealing elements, such as a hydrophobic gel or a rope swelling in the presence of water for example.

FIG. 2 presents a flow diagram of a particular embodiment of the method according to the invention.

This embodiment consists of effecting a degradation of the polymeric material of the protective sheath of an optical module along one of the generatrices thereof by softening in contact with a hot body in order to facilitate the removal thereof when it has reached a sufficient degradation level in order to make access possible to the optical fibres.

First of all, in a step 21, part of the external cladding 5 of the optical fibre transmission cable 1 is removed in order to extract therefrom one or more optical modules 2 for which the optical fibres 4 must be bared. This operation may be done both at the end of the cable and along the length of the cable.

The following step consists of stripping one of the optical modules 2 extracted over a given portion thereof.

Here "stripping" means the removal of the protective sheath 3 of the optical module 2 (and any reinforcement and/or sealing elements, when such are present) in order to bare the optical fibres 4.

To do this, a portion to be stripped of the protective sheath of the optical module 2 is heated in a step 22. This step consists of effecting a degradation by heating of the polymeric material of the protective sheath of the optical module 2 along a generatrix of the portion to be stripped of the protective sheath 3. The portion of the protective sheath 3 to be stripped is heated to a specific temperature of 130° C. degrading the polyethylene protective sheath 3, for a period of 3 seconds, 5 seconds being the maximum duration permitted. This specific temperature is chosen so as to create a sufficient degradation of the polyethylene material so that the sheath 3 is mechanically weakened along the generatrix that had been in contact with the heating body, without for all that impairing the mechanical and optical properties of the optical fibres 4 contained in the optical module 2. Parts of the sheath 3 may also be melted de facto making the optical fibres 4 accessible.

It is considered that the material of the protective sheath 3 has reached a sufficient level of degradation by softening when the sheath of the optical module significantly loses its mechanical resistance to longitudinal tearing and in some cases its mechanical integrity, in order to effect an easy and clean mechanical removal of it over a perfectly controlled length.

The inventors have demonstrated that this softening temperature, for a sheath made from a polyethylene material and having a thickness of between approximately 0.03 and 0.25 mm, should, at average atmospheric pressure, lie between 100° C. and 140° C. and the heating duration should not exceed three consecutive seconds. For the same heating duration, and below 100° C., the mechanical properties of the material of the sheath 3 are not sufficiently degraded (in other words the sheath is not sufficiently degraded) and weakened along the generatrix that was in contact with the heating body to allow removal of the sheath over a perfectly controlled length and, above 140° C., the optical fibres 4 contained in the optical module 2 could be damaged.

It should be noted that a heating of the polymeric material to a temperature lying between 100° C. and 140° C. for a duration shorter than 0.5 seconds could not suffice to reach the required level of degradation of the sheath.

For an optical module the protective sheath of which is made from HDPE for example, the degradation temperature applied is around 130° C.

Once sufficiently weakened by softening, and then cooled to a certain extent (non-obligatory step), the protective sheath 3 of the optical module 2 is then stripped, in a step 23, by longitudinal tearing along the previously weakened generatrix in order to allow access to the optical fibres. Removal is easy and can be done over several meters of module in a well-controlled fashion, while guaranteeing good mechanical and optical strength of the optical fibres.

With the optical module 2 thus stripped, the optical fibres 4 the mechanical and optical properties of which have been perfectly preserved are then cleaned by means of a solution based on ethanol and/or petrol in order to remove any residues of the sheath 3 (step referenced 24 in the figure).

In the case where the optical module 2 also contains a gel, removal of gel from the optical fibres may be done by means of a degreasing detergent.

FIG. 3 shows schematically the implementation of a step of heating an optical module according to a particular embodiment of the method of the invention.

The heating step, the principle of which is described below in relation to FIG. 2 (step referenced 22), is here performed by means of a heating body 32 of a paint burner 30. The heating body 32 is shown on a member 31 arranged so as to form a gripping means (not illustrated in the figure) and comprising a blower, an electrical heating element and the associated electronics. The heating body 32 has a shape of revolution. It serves both as a support and as heating means for the portion of optical module to be stripped.

The temperature of the heating body 32 can be checked by means of an infrared thermometer.

It should be noted that the shape of the heating body 32 may, advantageously, be cylindrical but other shapes may be envisaged without departing from the scope of the invention.

To perform this heating step, the operator first makes a loop with the optical module to be stripped and coils it around the heating body (arrow A). Then, secondly, he exerts a certain tension on the optical module 2 by pulling the optical module 2 on each side of the heating body 32 in the same direction (substantially perpendicular to the axis of the cylindrical heating body), as illustrated in the figure. Thirdly, the operator carries out a traction of the optical module in the direction of the arrow B with one hand while maintaining a certain tension with the other hand so as to linearly move the optical module on the heating body all along the portion to be stripped. The speed of movement of the module 2 over the heating body 32 is adjusted so that the portion of sheath to be degraded achieves sufficient softening, but so that the duration of heating, for a given point on the sheath 3, does not exceed three seconds.

It will be understood that only part of the circumferential surface of the protective sheath 3 is heated and is therefore degraded, or even melted, and in all cases weakened in contact with the heating body 32.

Once the mechanism of degradation by heating has been implemented, the sheath 3 of the optical module 2 having sufficiently lost its mechanical integrity over a perfectly controlled length, the operator may therefore proceed with stripping of the protective sheath by simple mechanical removal thereof in order to bare (and made accessible) the cluster of optical fibres.

The heating step described above is implemented by means of a paint burner, by way of purely illustrative example. This has the advantage of being portable and therefore being able to be brought easily to the site in the context of optical fibre transmission cable installations for example. It is clear however that this heating step can easily be implemented by means of many other heating means, without departing from the scope of the invention.

An embodiment of the disclosure provides a technique for accessing to at least one optical fibre contained in an optical module of an optical fibre transmission cable that is simple, rapid and inexpensive to implement.

An embodiment provides such a technique that causes neither deformation nor impairment, on both the mechanical and the optical level, of the optical fibre or fibres included in an optical module.

An embodiment provides such a technique that can be applied to all types of optical fibre transmission cable of a type comprising at least one optical module, and more particularly with a flexible structure.

Although the present disclosure has been described with reference to one or more examples, workers skilled in the art will recognize that changes may be made in form and detail without departing from the scope of the disclosure and/or the appended claims.

The invention claimed is:

1. A method comprising:
   accessing at least one optical fibre contained in an optical module of an optical fibre transmission cable, the optical module comprising a protective sheath made from polymeric material, belonging to the family of thermoplastic polymers, in which said at least one optical fibre is housed, wherein accessing comprises:
   extracting said optical module from said transmission cable;
   irreversibly degrading the polymeric material over a portion to be stripped of the sheath of said optical module by heating to a predetermined temperature comprised between 100° C. and 140° C., for a predetermined period;
   accessing said at least one optical fibre by stripping said portion that has been degraded by heating; and
   cleaning said at least one optical fibre made accessible.

2. The method according to claim 1, wherein the predetermined temperature is substantially equal to 130° C.

3. The method according to claim 1, wherein the predetermined duration is less than 5 seconds.

4. The method according to claim 1, wherein degrading the polymeric material is performed by a heating body.

5. The method according to claim 4, wherein degrading the polymeric material comprises moving said optical module over a heated surface of the heating body all along the portion to be stripped.

6. The method according to claim 4, wherein degrading the polymeric material comprises moving the heating body over the optical module all along the portion to be stripped.

7. The method according to claim 1, wherein the protective sheath of said optical module has a thickness of between 0.03 mm and 0.25 mm.

8. A method comprising:
   extracting an optical module from an optical fibre transmission cable, the optical module comprising a protective sheath made from polymeric material, belonging to the family of thermoplastic polymers, in which at least one optical fibre is housed;
   using a heating body to irreversibly degrade the polymeric material over a portion to be stripped of the sheath by heating the polymeric material to a predetermined temperature comprised between 100° C. and 140° C., for a predetermined period;
   accessing said at least one optical fibre by stripping said portion that has been degraded by heating; and
   cleaning said at least one optical fibre made accessible.

9. The method according to claim 1, wherein the polymeric material of the sheath of the optical module is a material belonging to the family of thermoplastic polyolefins.

10. The method according to claim 1, wherein the polymeric material of the sheath of the optical module is a material belonging to the family of polyethylenes.

* * * * *